(12) United States Patent
Erickson

(10) Patent No.: US 8,694,496 B2
(45) Date of Patent: Apr. 8, 2014

(54) HARVESTING APPLICATION METADATA

(75) Inventor: Richard Erickson, Farmingdale, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 261 days.

(21) Appl. No.: 12/393,609

(22) Filed: Feb. 26, 2009

(65) Prior Publication Data

US 2010/0131505 A1  May 27, 2010

Related U.S. Application Data

(60) Provisional application No. 61/118,363, filed on Nov. 26, 2008.

(51) Int. Cl.
*G06F 17/30* (2006.01)

(52) U.S. Cl.
CPC .... *G06F 17/30699* (2013.01); *G06F 17/30864* (2013.01)
USPC ........... 707/732; 707/737; 707/749; 707/784; 707/796

(58) Field of Classification Search
CPC ........... G06Q 30/0269; G06Q 30/0241; G06F 17/30864; G06F 17/30699
USPC .............. 707/1, 2, 3, 4, 100, 104.1, 737, 749, 707/796, 732, 734, 784
See application file for complete search history.

(56) References Cited

U.S. PATENT DOCUMENTS

| | | | |
|---|---|---|---|
| 6,466,969 B1 | 10/2002 | Bunney et al. | |
| 6,487,584 B1 | 11/2002 | Bunney | |
| 6,669,564 B1 | 12/2003 | Young et al. | |
| 6,775,267 B1 | 8/2004 | Kung et al. | |
| 6,839,680 B1 | 1/2005 | Liu et al. | |
| 6,925,469 B2 | 8/2005 | Headings et al. | |
| 7,124,101 B1 | 10/2006 | Mikurak | |
| 7,139,757 B1 * | 11/2006 | Apollonsky et al. | ... 707/999.003 |
| 7,149,698 B2 | 12/2006 | Guheen et al. | |
| 7,315,826 B1 | 1/2008 | Guheen et al. | |
| 7,664,726 B2 * | 2/2010 | Jain et al. | ............... 707/999.001 |
| 7,706,740 B2 * | 4/2010 | Collins et al. | ................ 455/3.01 |
| 7,747,962 B2 * | 6/2010 | Othmer | ......................... 715/774 |
| 7,827,170 B1 * | 11/2010 | Horling et al. | ................ 707/722 |
| 7,836,151 B2 * | 11/2010 | Bellotti et al. | ................ 709/218 |
| 7,844,603 B2 * | 11/2010 | Lucovsky et al. | ............. 707/728 |
| 7,870,023 B2 * | 1/2011 | Ozer et al. | .................... 705/14.4 |
| 7,912,458 B2 * | 3/2011 | Ramer et al. | .................. 455/418 |
| 8,131,271 B2 * | 3/2012 | Ramer et al. | ................ 455/414.1 |
| 8,290,513 B2 * | 10/2012 | Forstall et al. | ............. 455/456.3 |

(Continued)

*Primary Examiner* — Fred I Ehichioya
*Assistant Examiner* — Dangelino Gortayo
(74) *Attorney, Agent, or Firm* — Scott P. Zimmerman, PLLC (57) ABSTRACT

A method for harvesting application metadata includes receiving metadata from a web application and storing the metadata to a metadata collection. The metadata indicates a characteristic of a web application user. The metadata collection identifies the user and may include metadata from other web applications. The advertisement is then characterized. For example, keywords may be associated with the advertisement. An affinity between the advertisement and the user is then determined and an indication of the affinity is recorded. When the affinity exceeds a predetermined threshold, the user may be identified as a potential target of the advertisement. The service provider may then identify the potential targets to the advertiser or provide the advertisement to the targets on behalf of the advertiser. The web application may be compensated for providing the metadata. The compensation may occur in response to the metadata resulting in identifying the user as a potential target.

13 Claims, 4 Drawing Sheets

(56) References Cited

U.S. PATENT DOCUMENTS

| | | |
|---|---|---|
| 2005/0262024 A1 | 11/2005 | Headings et al. |
| 2006/0205510 A1 | 9/2006 | Lauper et al. |
| 2006/0287919 A1* | 12/2006 | Rubens et al. ............... 705/14 |
| 2007/0078835 A1* | 4/2007 | Donnelli ........................ 707/3 |
| 2007/0198343 A1* | 8/2007 | Collison et al. ............... 705/14 |
| 2007/0199014 A1 | 8/2007 | Clark et al. |
| 2008/0040354 A1* | 2/2008 | Ray et al. ...................... 707/10 |
| 2008/0108337 A1 | 5/2008 | Pomerantz et al. |
| 2008/0108342 A1 | 5/2008 | Pomerantz et al. |
| 2008/0147482 A1* | 6/2008 | Messing et al. ............... 705/10 |
| 2008/0290987 A1* | 11/2008 | Li ................................... 340/5.1 |
| 2009/0018915 A1* | 1/2009 | Fisse .............................. 705/14 |
| 2009/0106234 A1* | 4/2009 | Siedlecki et al. .............. 707/5 |
| 2009/0164301 A1* | 6/2009 | O'Sullivan et al. ........... 705/10 |
| 2009/0287683 A1* | 11/2009 | Bennett .......................... 707/5 |
| 2009/0327251 A1* | 12/2009 | Walmer .......................... 707/4 |

* cited by examiner

HARVESTING APPLICATION METADATA

This application claims priority from provisional application 61/118,363 filed Nov. 26, 2008, which is incorporated herein by this reference as if set forth in its entirety.

BACKGROUND

1. Field of the Disclosure

The present application relates to application metadata and, more particularly, to harvesting application metadata for advertising.

2. Description of the Related Art

Currently, a web application creator who wants to monetize metadata generated by the application through advertising may attempt to negotiate with advertisers directly or leverage a service that will crawl a site associated with the application and automatically select ads for placement there. Direct negotiation with advertisers is generally outside the core expertise of many web application developers. Existing third party services, on the other hand, are myopic in their approach to ad placements. For example, ads placed with a web application are determined more or less solely based on the metadata generated by that web application. When a web application delivers a piece of metadata that may be valuable in combination with other information, including, for example, metadata generated by other web applications, traditional services may not adequately value the metadata or the application that generates it. This inefficient services ecosystem may result in a situation where some web applications, although undervalued, are maintained as "labors of love" by their creators. Ultimately, however, this development paradigm will result in lower quality and less diverse applications.

DESCRIPTION OF EXEMPLARY EMBODIMENTS

Many users of public networks, such as the Internet, interact with web applications by using a browser. Web applications also reach many users of wireless devices. The user interaction with web applications may generate metadata that describe some characteristic, for example purchasing behavior, preference, or location of the user. One avenue for monetizing metadata generated by web applications involves aggregating and harvesting the metadata for advertising purposes, such as identifying advertising target groups based on specific criteria.

Wikipedia refers to "Web 2.0" as a perceived second generation of web development and design, that aims to facilitate communication, secure information sharing, interoperability, and collaboration on the World Wide Web. Web 2.0 concepts have led to the development and evolution of web-based communities, hosted services, and applications; such as social-networking sites, video-sharing sites, wikis, blogs, and the like. In some aspects, the disclosed subject matter includes a metadata collection approach suitable for a Web 2.0 environment in which a number of dedicated, special purpose, and/or independently developed web applications, operating independently of one another on the web.

In one aspect, a disclosed method for harvesting application metadata includes receiving metadata from a web application. The metadata is indicative of a characteristic of a user of the web application and/or a context of the user/application interaction. The metadata may be stored to a metadata collection that includes an identifier of the web application user and web application user metadata generated by a plurality of other web applications.

The method may further include characterizing one or more advertisements and, based on the characterization of the advertisements and the metadata collection, determining an affinity between the advertisements and the web application user. The affinity indication may be stored to a storage device and disclosed to a source of the advertisements for a fee.

In some embodiments, web application users are identified as potential targets for the advertisement if the affinity exceeds a predetermined threshold. The set of potential targets may then be disclosed to a source of the advertisement for a fee. In other embodiments, the metadata may be provided from the metadata collection to potential advertisers directly. In other implementations, the metadata collection service may provide advertisements to the identified candidates on behalf of the advertisement sources.

The fee charged may be based at least in part on a magnitude of the affinity. For example, the fee associated with identifying highly relevant potential targets may be higher than the fee for less relevant targets. The metadata, itself, may include chronological information indicative of when the user interaction occurs and/or location information indicative of a geographic location associated with the user interaction. The user characteristic that the metadata is indicative of may include a user preference, a user interest, a user's consumption, or a user's behavior.

The operation of receiving metadata may be performed for a first plurality of users and each of the first plurality of users may correspond to one of a first plurality of user metadata collections.

Some embodiments include compensating an author of, owner of, or other entity associated with a web application for providing the metadata. These embodiments would employ a technique for tracking the owners of various applications. Compensation may accrue when metadata is used to select an advertisement for a user or to identify a user as a potential target of an advertisement.

In certain implementations, the method further includes receiving monetary compensation for responding to the request for an advertisement target group. The method may further include providing monetary compensation for receiving the metadata.

In another aspect, a disclosed database server for harvesting application metadata includes a processor, and memory media, accessible to the processor, in which processor executable instructions are embedded or otherwise stored. The database server may further include a network adapter accessible to the processor for communicating with the user application.

The instructions stored in the memory media may be executable to receive metadata from a web application and append the received metadata to a metadata database. The metadata may be indicative of a characteristic of the user and/or a context of the user's interaction with the application. The metadata database may include user metadata gathered from a plurality of user applications.

A vendor or advertiser may specify advertising criteria and the instructions may be operable to determine from the metadata database whether the user matches the advertising criteria. When the user matches the advertising criteria, the instructions may include instructions executable to inform the vendor or advertiser of a potential target and/or return at least a portion of the user metadata profile or affinity information to the vendor or advertiser.

In some instances, the received metadata may include information indicative of at least one of when and where the user interaction occurred. The network adapter may be coupled to a wireless network, wherein the user application executes on a wireless communication device. The instructions may be executable to record a credit for responding to the request. The instructions may further be executable to record a charge for receiving the metadata. The charge may be at least one of a credit and a debit. When the user matches the advertisement criteria, the instructions may further be executable to notify the web application that the received metadata was used to match the advertisement criteria.

In a further aspect, a service for advertising using application metadata includes, in response to receiving a first request for advertising specifying an advertising criteria, sending a second request for a target group satisfying the advertising criteria, and recording an indication of at least one of the first and second requests to a storage device. After sending the second request, the service may further include receiving a plurality of identifiers for a respective plurality of individuals included in the target group, wherein each of the plurality of individuals are included in the target group based on an affinity between metadata collected from a plurality of web applications and an advertisement or a set of advertisement criteria.

In some embodiments, the service may include sending an indication of the plurality of identifiers in the target group. The service may further include recording a first charge for sending a response to the first request, and recording a second charge for receiving a response to the second request. The first and the second charge may be at least one of a debit and a credit. The service may still further include causing an advertisement to be sent to the target group using the plurality of identifiers. In some cases, each of the plurality of identifiers may be at least one of a network address, a network identity, a digital certificate, a network location, an electronic marketplace identity, a wireless service identifier, and an email address.

In other embodiments, the method may involve selecting an advertisement for a particular user from an inventory of potential advertisements when the opportunity to present an advertisement to the user arises, such as when the user is enjoying a broadcast, podcast or visiting a website. Selection of the advertisement for that user is based on an affinity score and other criteria (e.g., the amount that different advertisers are willing to pay for a given degree of affinity). The affinity score is derived from metadata associated with the advertisements, as supplied by the advertisers, and from the metadata associated with the user, as stored in the metadata database. Selection of an advertisement may result in a charge to the advertiser and compensation to the metadata sources that supplied user metadata relevant to the selection of the advertisement.

In another aspect, disclosed computer-readable memory media include processor executable instructions for implementing a web application for interacting with users of the Internet. The instructions may be executable to interact with users of the web application in a browser environment, generate metadata for individual users based on said instructions to interact, and send the generated metadata to a metadata database, wherein individual users are associated with the generated metadata. The instructions may further be executable to receive a receipt recording monetary compensation for the generated metadata from at least one of: an entity associated with the metadata database, an advertiser configured to access the metadata database, and a vendor ordering advertisements based on the metadata database.

In another aspect, a disclosed computer program product, comprising computer readable storage media including instructions for harvesting metadata, includes instructions for receiving metadata each of a plurality of web applications where the metadata is indicative of a characteristic of a user of the corresponding application. The metadata from the plurality of web applications is collected, for a specified user, in a user profile. Upon receiving an indication of a product, service, or advertising criteria, an affinity between a user profile and the item is determined and information based on the affinity information is disseminated to a vendor of the product or service. The affinity is indicative of a relevance of the item to the user. The computer program product may further include compensating an entity associated with the applicable web application when metadata information relevant to a particular item is included or otherwise used. Disseminating information based on the affinity information may include indicating whether a particular user is a member of a target group or indicating which of a set of advertisements is suitable for a specified user.

In still another aspect, a computing device including a processor and memory or other type of storage accessible to the processor, includes a program in the form of processor executable instructions for harvesting metadata. The computer program instructions include instructions for grouping metadata received from a plurality of web applications into user profiles. Each user profile represents metadata for a corresponding user, the metadata being indicative of a characteristic of a web application user. An affinity between a user represented by a user profile and a product or service represented by an advertisement or advertisement criteria is determined. Based on the determined affinity, targeted marketing information is made available to a vendor and the applicable web application owners are compensated based on a value of metadata provided by their respective web applications.

Making targeted marketing information available includes providing an indication of a group of users having affinities exceeding a specified threshold. Making targeted marketing information available may also include determining from a group of advertisements which advertisements are best suited for a specified user.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Figure 1:
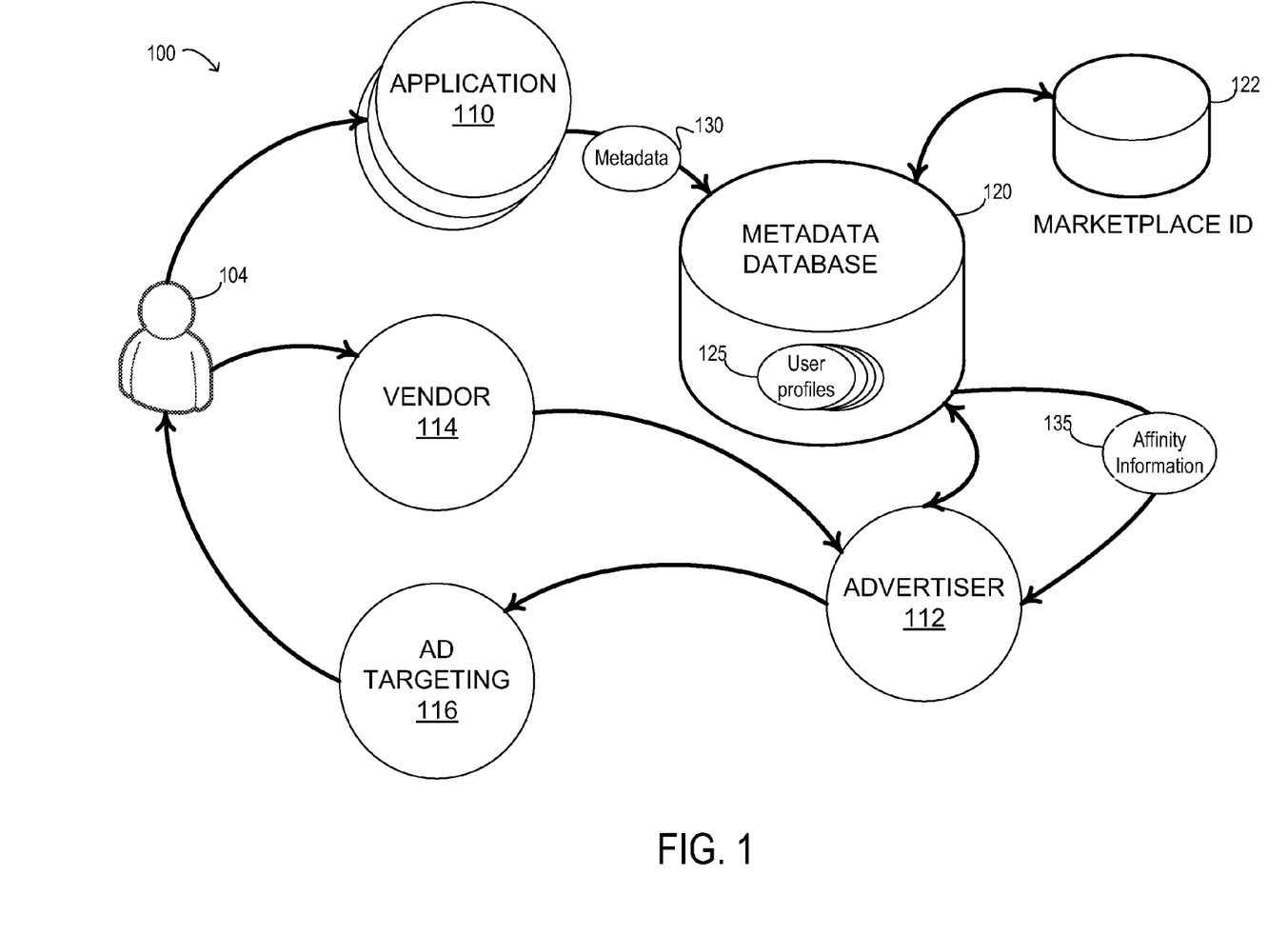
FIG. 1 is a flow diagram of selected elements of a business system using application metadata.

Referring to FIG. 1, flow diagram 100 of selected elements of a business system using application metadata is illustrated. Flow diagram 100 may be representative of various processes involving the entities depicted therein, as will now be described in detail. It is noted that the processes as depicted in diagram 100 may selectively show certain flows for clarity in the following description, while other flows are not shown to avoid obstruction. For example, a purchase flow may be explicitly depicted with a unidirectional arrow signifying revenue, while the return flow of the product/service remains implicit and is not shown in diagram 100. Thus, in some embodiments, flow diagram 100 may be construed to include implicit, or assumed, bidirectional flows between the entities depicted therein.

In FIG. 1, individual 104 may represent a user of a network (not shown in FIG. 1) over which application 110 is accessible. In some embodiments, the network is the Internet and application 110 is a web application. Individual 104 may interact with application 110, for example, by providing user input or other indicative information, and so enable application 110 to generate metadata 130, as will be further described below. Individual 104 may also represent a consumer of the products or services supplied by vendor 114. That is, individual 104 may generally represent a customer of vendor 114, who provides vendor 114 with sales volume and revenue. As such, individual 104 may also represent a desired target for advertising provided by ad targeting 116. Individual 104 may further represent one of a large number of users, consumers, and advertising targets.

Application 110 may represent one of a large number of web applications, which may be executable using a browser or an operating system, which, in turn, may execute on a fixed or wireless computing device. Thus, application 110 may be configured to execute in a wired (i.e., cabled) or wireless network environment, or any combination thereof. Application 110 may include a user interface and internal storage, such as an internal database system (not shown in FIG. 1). Application 110 may be devoted to a particular purpose, or may be a generalized informational portal. An individual, educational, or business entity (not shown in FIG. 1), referred to herein simply as the "developer," may create and operate application 110, and so, may own certain rights associated therewith.

In certain embodiments, application 110 may itself be a business platform associated with vendor 114, a venue for placing advertisements from ad targeting 116, or a combination thereof. For example, application 110 may be a web application for marketing a product line on behalf of vendor 114. In some cases, application 110 may be a web application for a small, local business. Application 110 may further provide directory or search services for a particular geographic area or market segment. In some cases, advertisements may be placed on the user interface of application 110 by ad targeting 116.

Application 110 may be configured to generate metadata 130 in response to interaction with users, such as individual 104. Metadata 130 may be indexed to specific users of application 110, for example, by including a reference to an identity of the user; such metadata is referred to herein as "user metadata." Application 110 may further generate metadata in a coordinated manner, such as in a standardized format. In one embodiment, application 110 is configured to generate user metadata in a format specifically expected by metadata database 120. The format of the metadata may be prescribed in an agreement with the developer to provide metadata from application 110. In some embodiments, application 110 includes program instructions for generating a specific type and format of metadata.

Metadata 130 may include a wide range of information. In some embodiments, metadata 130 includes information that is indicative of some type of characteristic of the application user. In these embodiments, metadata 130 is derived from interaction of application 110 with individual 104 (i.e., the user). In some instances, metadata 130 is generated from direct user interaction with application 110, such as by entering text or operating a user interface element. In certain cases, metadata is indirectly generated during user interaction with application 110, for example, by determining an actual or desired location for individual 104.

Metadata 130 may be collected and aggregated by metadata database 120 from a plurality of applications, such as application 110 shown in FIG. 1. In this manner, metadata for individual 104 may be harvested from different applications that individual 104 may interact with. The different types of application 110 may include web applications, browser applications or plug-ins, mobile applications, downloadable applications, widgets, gadgets, application components, website-specific applications, and others, including combinations thereof. Accordingly, metadata 130 may encompass information such as, but not limited to, marketplace identity, location information (e.g., global-positioning system (GPS) coordinates), telephone numbers, personal information, search terms, survey results, answers to questionnaires, inquiries, blog entries, responses to advertising, website visitations, and others, including combinations thereof. In some embodiments, metadata 130 indicates one or more characteristics of the user based on different types of user interaction with application 110.

For example, a user may interact with application 110 by filling information in a form or operating user interface elements, such as buttons, menus, selectors, controls, etc. Each user interaction may be tracked and recorded as metadata 130 and may be stored in metadata database 120 as a time-stamped event. In some cases, the location of a wireless device may be recorded while the user is interacting with application 110, and included in metadata 130.

Application 110 may utilize a programmatic interface (not shown in FIG. 1) to metadata database 120 for collecting and aggregating metadata 130. The programmatic interface may be specified or provided by a business entity associated with metadata database 120 to a plurality of developers. In some cases, the programmatic interface may send metadata 130 from application 110 to metadata database 120 in an expected format.

Metadata database 120, as shown in FIG. 1, may aggregate metadata 130 from a large number of applications 110, which may all be web applications. Metadata 130 may include an identifier for the user to which other elements in metadata 130 pertain. Accordingly, metadata database 120 may include collections of metadata 130, referred to herein as "user profiles" 125, which contain a collection of metadata 130 generated for a particular individual by a plurality of applications 110. User profiles 125 may be indexed using an identifier for the applicable user. Different applications may provide different metadata 130 in a user profile 125. An application 110 may also be configured to generate new elements in a user profile 125, for example, a new type of metadata 130.

In some embodiments, metadata database 120 may include user identifiers, not explicitly depicted, for indexing user profiles 125. The identifiers may include any one or more of: a network address, a network identity, a digital certificate, a network location, an electronic marketplace identity, a wireless service identifier, and an email address. However, metadata database 120 may also be configured to exclude user identities. For example, metadata database 120 may utilize email addresses as identifiers in user profiles 125, while the name, address, and other personal information about users may be excluded from user profiles 125. In this manner, metadata database 120 may be configured to conform to privacy requirements for collecting user information. Metadata database 120 may further be configured to access external databases for obtaining an identity for a user.

FIG. 1 further depicts a marketplace ID 122. Marketplace ID 122 represents an external database that metadata database 120 may use to obtain a marketplace identity for a user. In one example, metadata database 120 queries marketplace ID 122 using a user identifier and may obtain, in return, the marketplace identity of the user associated with the user identifier. Marketplace ID 122 may be maintained by a different business entity than metadata database 120. Some examples of marketplace identities are Internet accounts provided by Google, Yahoo, Hotmail, and MS-Network, among others.

As shown in FIG. 1, an advertiser 112 may obtain user affinity information 135 for advertising purposes. Advertiser 112 may represent a separate business entity providing advertising services to customers, such as vendor 114. Advertiser 112 may provide services such as, but not limited to, targeting strategies, implementing advertising campaigns, creating advertising media, and public relations. Advertiser 112 may further represent any advertising entity desiring to identify specific target groups for advertising or marketing purposes. In some embodiments, advertiser 112 may send metadata database 120 a request for an advertising target group based on advertising criteria. In other embodiments, advertiser 112 may provide an advertisement directly to metadata database 120. The advertising criteria may be related to information stored in user profiles by metadata database 120. Metadata database 120 may include functionality to determine affinity information 135 between users represented by user profiles 125 and the advertisement and/or advertisement criteria. Affinity information 135 encompasses information indicating a degree of relevance, correlation, dependence, or some other type of relationship between a user, represented by a user profile 125, and products or services represented by an advertisement or set of advertisement criteria provided by advertiser 112. Although FIG. 1 depicts distinct entities for advertiser 112 and vendor 114, the roles of advertiser 112 and vendor 114 may be performed within a single entity or organization in other embodiments.

Advertiser 112 may receive user identifiers from metadata database 120 in response to the request. Advertiser 112 may further cause advertisements to be disseminated by ad targeting 116 to individuals (users) who are included as members of the target advertising group. In some embodiments, advertiser 112 may be credited or debited or both for services related to querying metadata database 120 for user profiles.

In FIG. 1, ad targeting 116 represents an entity or business operation for providing advertisements to individuals or users, such as individual 104. Ad targeting 116 may provide advertisements to selected market segments, or groups of users. As mentioned above, ad targeting 116 may receive an order from advertiser 112 for advertising specifying a target group. Ad targeting 116 may use information provided by advertiser 112 to generate and/or disseminate the advertising. The advertising itself may be any one or more of various media, including but not limited to text, images, video, audio, or a combination thereof, provided to print media, radio media, television operators, Internet websites, email, or a combination thereof. In some cases, the advertising represents an interactive medium, wherein users may respond directly to the advertising.

As shown in FIG. 1, vendor 114 represents a merchant for goods or services provided to individual 104, and from which revenue is received. Vendor 114 may be a manufacturer, a distributor, or a retailer, or a combination thereof. Vendor 114 may provide tangible or intangible products, or may provide a service. Vendor 114 may represent essentially any size of business, with either local or distributed market reach. In some embodiments, vendor 114 operates a website on which advertising may be provided. In some cases, application 110 may execute from a website of vendor 114.

In one embodiment, elements of business system 100 depicted in FIG. 1, such as application 110, metadata database 120, advertiser 112, and ad targeting 116, may represent different business entities. In some cases, different elements may be combined and represent a single business entity. For example, in some embodiments, advertiser 112 and ad targeting 116 are functions performed by a single business entity. In some implementations, metadata database 120 and advertiser 112 may be consolidated as a single business entity.

Thus, business system 100 in FIG. 1 may represent a number of different business entities, which may charge each other for services provided. Thus, business system 100 may represent a platform for aggregating user metadata, and for monetizing the user metadata through advertising. In one embodiment, business system 100 may describe an example of sharing advertising revenue with applications providing user metadata.

Referring, for the following example, to the elements in business system 100 of FIG. 1 as business entities, advertiser 112 may receive advertising revenue from vendor 114 for designing and generating ads specifically targeting potential customers. Advertiser 112 may pay metadata database 120 for providing user identifiers belonging to a target group, in response to providing a desired advertising criteria. Metadata database 120, may, in turn, provide application 110 monetary compensation for providing metadata 130, which was used to determine a target group, and generate advertising revenue. In this manner, a potentially large number of applications may be compensated for providing a portion of metadata 130, which may induce additional developers to provide more applications.

In some embodiments, the revenue stream may be reversed for at least some of the processes described above. For example, application 110 may be charged for the right to provide metadata 130 to metadata database 120. Metadata database 120 may pay advertiser 112 for using metadata database 120 to obtain target groups from the available user profiles.

Figure 2:
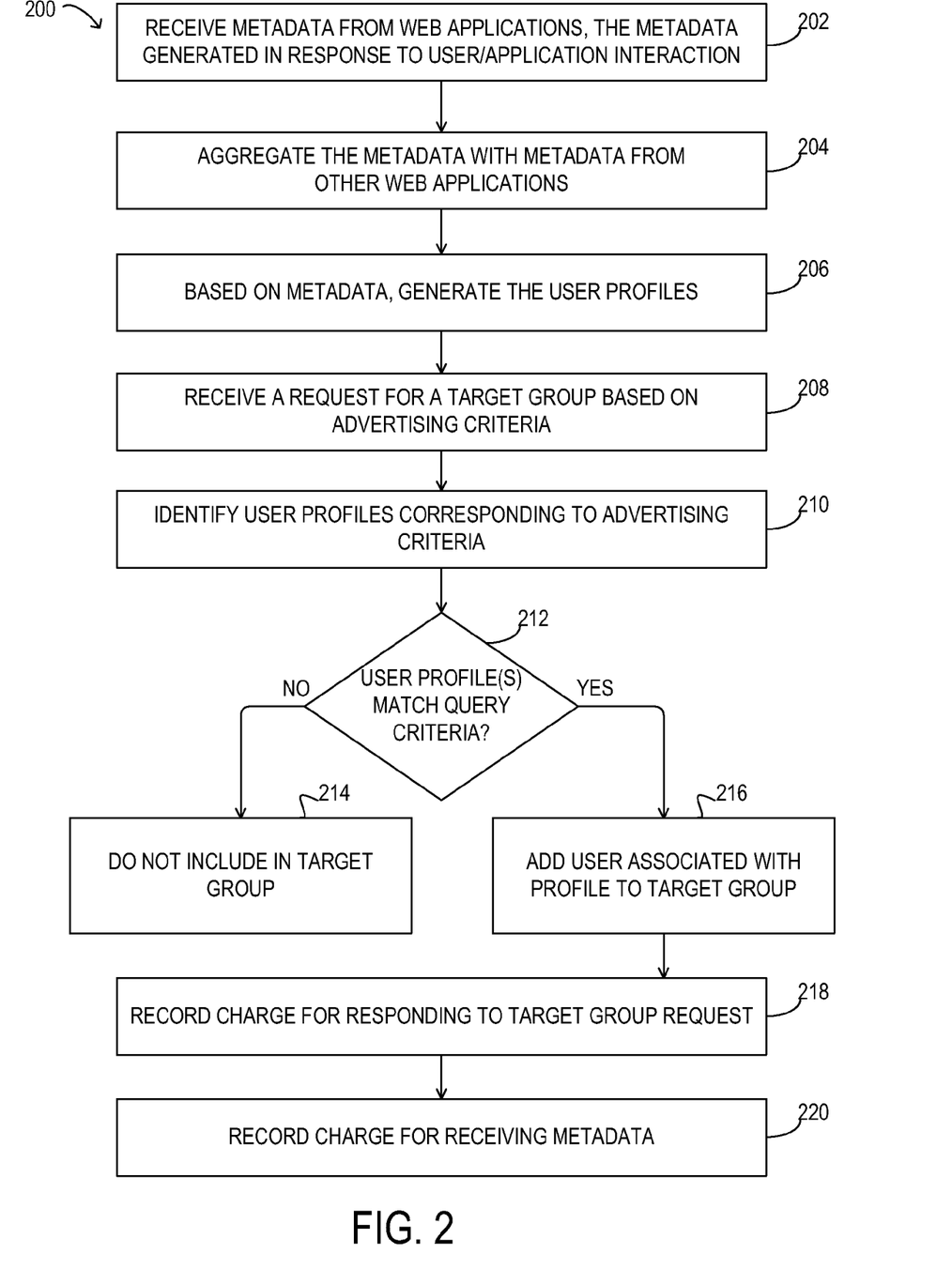
FIG. 2 is a block diagram of selected elements of an embodiment of a method for harvesting application metadata.

Turning now to FIG. 2, a block diagram of selected elements of an embodiment of a method 200 for harvesting application metadata is illustrated. In one embodiment, method 200 may be executed by metadata database 120, or a computer system associated therewith. In some embodiments, vendor 114 may perform at least some portions of method 200. It is noted that the operations described with respect to FIG. 2 are exemplary, and may be selectively omitted or rearranged in different embodiments.

Metadata describing user events may be received from web applications (operation 202). The metadata may be generated in response to or describe a user interaction with the web application, such as but not limited to data input, operation of a user interface, messaging, audio input, location information or a combination thereof. The web application may be configured to process the metadata with a specified application programming interface (API), which may reformat or rearrange the metadata prior to sending. Thus, the metadata may be received in a defined, or expected, format in operation 202. The metadata may be received from different web applications and for different users in operation 202.

The metadata may be aggregated with metadata from other web applications (operation 204). A user may interact with a number of different web applications, each of which may provide user metadata. Thus, the metadata may be aggregated from different web applications and for different users in operation 204. Based on the metadata, user profiles may be generated (operation 206). In one embodiment, user profiles include an identifier for the user, along with information based on user metadata.

A request for a target group based on advertising criteria may be received (operation 208). The request may be in the form of a query including the advertising criteria. The advertising criteria may be associated with a particular type of metadata, or a specific portion of the user profile. For example, an advertising criteria may involve any association with 'Thai food,' such as a search query, a blog entry, or a website visit that may be linked to Thai cuisine. User profiles corresponding to the advertising criteria may be identified (operation 210). In some embodiments, a query is performed on an metadata database according to the advertising criteria, and the results of the query may be used to identify a match.

A decision may be made whether or not user profiles match the query criteria (operation 212). In some embodiments, a user profile matches query criteria if there is a sufficient affinity between the user, based on the profile, and the advertising criteria. If the answer to operation 212 is NO, then the user associated with the user profile is not included in the target group (operation 214). If the answer to operation 210 is YES, then the user associated with the user profile included in the target group (operation 216). In some cases, a user identifier may be appended to a list in operation 216.

A charge for responding to the target group request may be recorded (operation 218). The charge in operation 218 may be a debit or a credit or both. In one embodiment, an advertiser is charged for obtaining target group information in operation 218. A charge for receiving the metadata may be recorded (operation 220). The charge in operation 220 may be a debit or a credit or both. In one embodiment, a developer of a web application is provided compensation for metadata generated by the web application in operation 220. A recorded charge may be used to issue an invoice or to directly cause a payment to be transferred.

Figure 3:
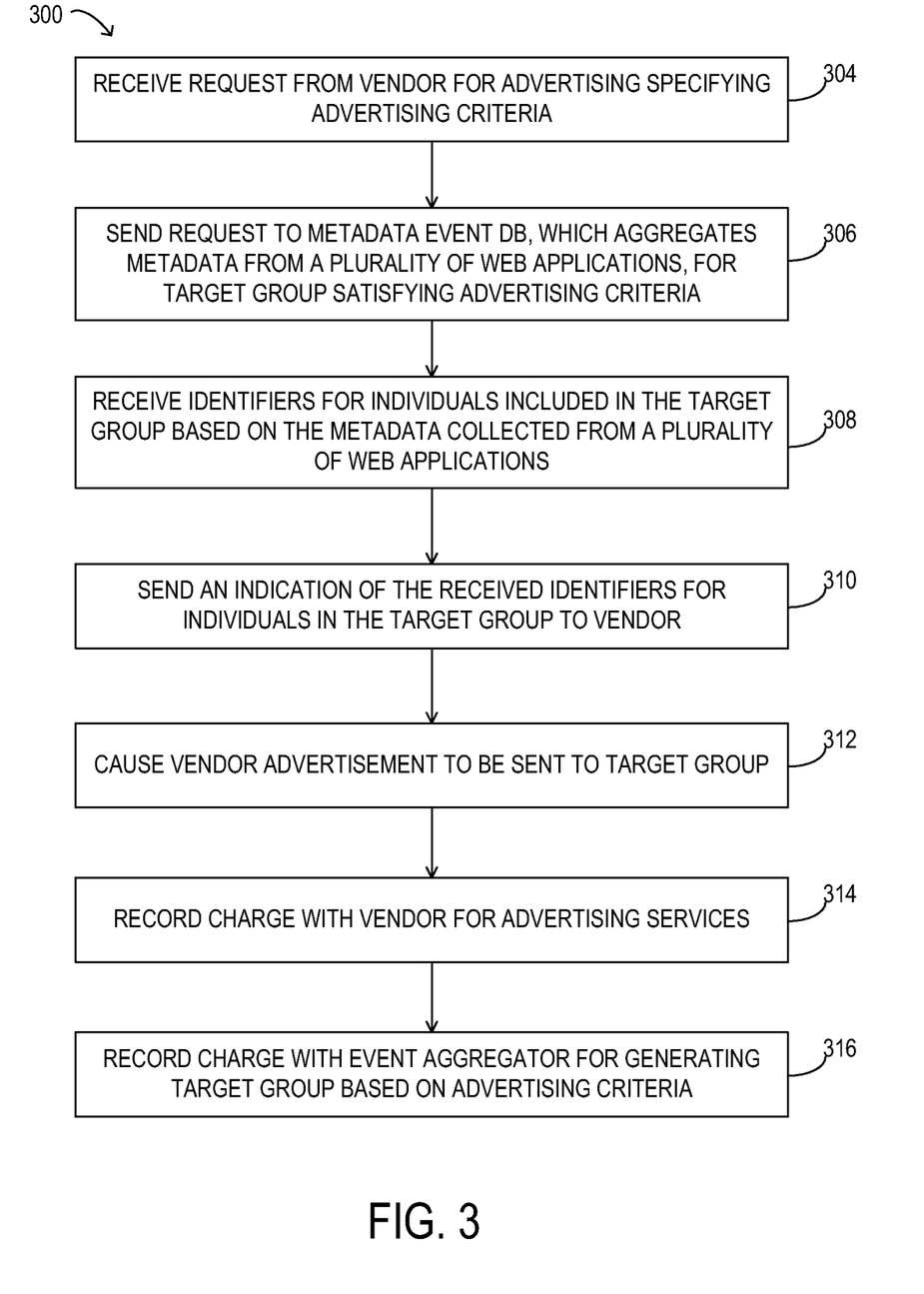
FIG. 3 is a block diagram of selected elements of an embodiment of a method for harvesting application metadata.

Advancing now to FIG. 3, a block diagram of selected elements of an embodiment of a method 300 for harvesting application metadata is illustrated. In one embodiment, method 300 may be executed by advertiser 112, or a computer system associated therewith. In certain embodiments, a single business entity controls metadata database 120 and advertiser 112 and performs method 300. In some cases, the single business entity performing method 300 additionally controls ad targeting 116. In some embodiments, vendor 114 may perform at least some portions of method 300. It is noted that the operations described with respect to FIG. 3 are exemplary, and may be selectively omitted or rearranged in different embodiments.

A request for advertising specifying advertising criteria may be received from a vendor (operation 304). The advertising criteria may be associated with a business purpose of the vendor, and may be used to identify at least one advertising target. A request for a target group satisfying the advertising criteria may be sent to a metadata database, which aggregates metadata from a plurality of web applications (operation 306). In some embodiments of operation 306, members of a target group are identified based on metadata received from a plurality of web applications. Identifiers for individuals included in the target group based on the metadata collected from a plurality of web applications may be received (operation 308).

An indication of the received identifiers for individuals in the target group may then be sent to the vendor (operation 310). Method 300 may then cause a vendor advertisement to be sent to the target group (operation 312). In some embodiments, an advertisement, along with the target group, is sent to an ad targeting entity for distribution or dissemination in operation 312. A charge for advertising service may be recorded with the vendor (operation 314). The charge in operation 314 may be a debit or a credit or both. A charge for generating the target group based on the advertising criteria may be recorded with the event aggregator (operation 316). The charge in operation 316 may be a debit or a credit or both. A recorded charge may be used to issue an invoice or to directly cause a payment to be transferred.

Figure 4:
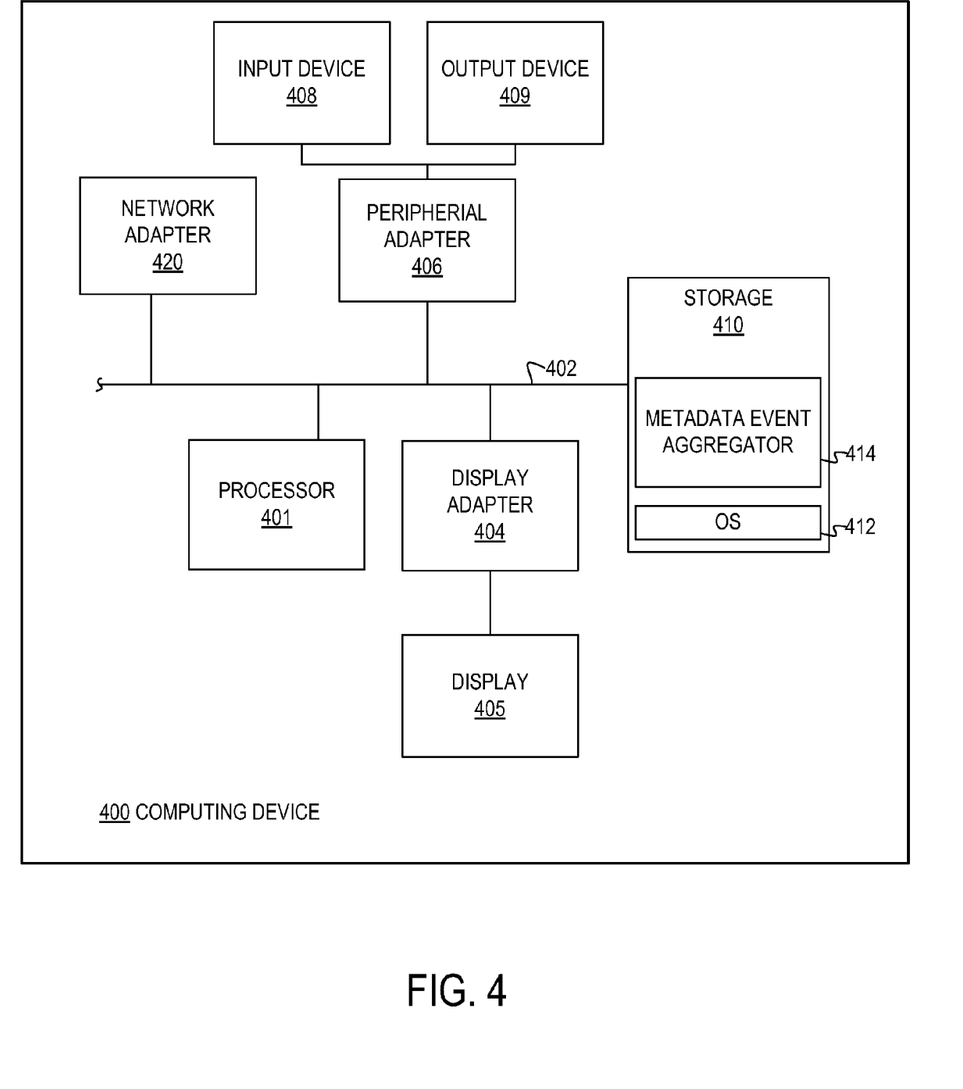
FIG. 4 is a block diagram of selected elements of an embodiment of a computing device.

Referring now to FIG. 4, a block diagram illustrating selected elements of an embodiment of a computing device 400 is presented. In the embodiment depicted in FIG. 4, device 400 includes processor 401 coupled via shared bus 402 to storage media collectively identified as storage 410.

Device 400, as depicted in FIG. 4, further includes network adapter 420 that interfaces device 400 to a network (not shown in FIG. 4). In embodiments suitable for use with adaptive application interface management, device 400, as depicted in FIG. 4, may include peripheral adapter 406, which provides connectivity for the use of input device 408 and output device 409. Input device 408 may represent a device for user input, such as a keyboard or a mouse, or even a video camera. Output device 409 may represent a device for providing signals or indications to a user, such as loudspeakers for generating audio signals.

Device 400 is shown in FIG. 4 including display adapter 404 and further includes a display device or, more simply, a display 405. Display adapter 404 may interface shared bus 402, or another bus, with an output port for one or more displays, such as display 405. Display 405 may be implemented as a liquid crystal display screen, a computer monitor, a television or the like. Display 405 may comply with a display standard for the corresponding type of display. Standards for computer monitors include analog standards such as video graphics array (VGA), extended graphics array (XGA), etc., or digital standards such as digital visual interface (DVI) and high definition multimedia interface (HDMI), among others. A television display may comply with standards such as National Television System Committee (NTSC), Phase Alternating Line (PAL), or another suitable standard.

Display 405 may include an output device 409, such as one or more integrated speakers to play audio content, or may include an input device 408, such as a microphone or video camera. In some embodiments, device 400 may be configured without (i.e., may exclude) at least one of input device 408, output device 409, and display 405.

Storage 410 encompasses persistent and volatile media, fixed and removable media, and magnetic and semiconductor media. Storage 410 is operable to store instructions, data, or both. Storage 410 as shown includes sets or sequences of instructions, namely, an operating system 412, and a metadata event aggregator 414. Operating system 412 may be a UNIX or UNIX-like operating system, a Windows® family operating system, or another suitable operating system.

It is noted that in some embodiments, device 400 represents a computing platform for executing metadata database 120, shown in FIG. 1. In some cases, metadata event aggregator 414 may represent functionality, such as processor executable instructions, provided by metadata database 120.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method for harvesting application metadata, the method comprising:
- receiving metadata sent from a mobile wireless device to a metadata server, the metadata describing interactions by a user with one of multiple web applications executed by the mobile wireless device;
- storing the metadata in a database in the metadata server;
- associating the metadata to a user profile associated with the mobile wireless device, the user profile grouping the metadata according to a corresponding web application generating the metadata;
- receiving a request for a target group from an advertiser, the request specifying advertising criteria;
- querying the database for the advertising criteria;
- retrieving a group of user profiles having the metadata that matches the advertising criteria;
- generating a list of identifiers for the group of user profiles, each identifier in the list of identifiers corresponding to one user profile in the group of user profiles having the metadata that matches the advertising criteria;
- sending the list of identifiers to the advertiser in response to the request for a target group;
- charging a fee to the advertiser for the list of identifiers and for querying the database for the advertising criteria;
- determining which ones of the multiple web applications generated the metadata matching the advertising criteria; and
- sharing the fee with the ones of the multiple web applications generating the metadata matching the advertising criteria.

2. The method of claim 1, further comprising scoring a match between the metadata and the advertising criteria.

3. The method of claim 2, further comprising basing the fee on a magnitude of the scoring.

4. The method of claim 1, further comprising sending an advertisement to the list of identifiers.

5. The method of claim 1, further comprising specifying the metadata to match the advertising criteria.

6. The method of claim 1, further comprising sharing the fee according to a portion of the metadata generated by each one of the multiple web applications generating the metadata matching the advertising criteria.

7. The method of claim 1, further comprising determining a marketplace identifier associated with each identifier in the list of identifiers.

8. A computing device, comprising:
- a processor; and
- memory storing code that when executed cause the processor to perform operations, the operations comprising:
  - receiving metadata sent from a mobile wireless device to a metadata server, the metadata describing interactions by a user with one of multiple web applications executed by the mobile wireless device;
  - storing the metadata in a database in the metadata server;
  - associating the metadata to a user profile associated with the user mobile wireless device, the user profile grouping the metadata according to a corresponding web application generating the metadata;
  - receiving a request for a target group from an advertiser, the request specifying advertising criteria;
  - querying the database for the advertising criteria;
  - retrieving a group of user profiles having the metadata that matches the advertising criteria;
  - generating a list of identifiers for the group of user profiles, each identifier in the list of identifiers corresponding to one user profile in the group of user profiles having the metadata that matches the advertising criteria;
  - sending the list of identifiers to the advertiser in response to the request for a target group;
  - charging a fee to the advertiser for the list of identifiers and for querying the database for the advertising criteria;
  - determining which ones of the multiple web applications generated the metadata matching the advertising criteria; and
  - sharing the fee with the ones of the multiple web applications generating the metadata matching the advertising criteria.

9. The computing device of claim 8, wherein the operations further comprise scoring a match between the metadata and the advertising criteria.

10. The computing device of claim 9, wherein the operations further comprise charging the fee based at least in part on a magnitude of the scoring.

11. The computing device of claim 8, wherein the operations further comprise sharing the fee according to a portion of the metadata generated by each one of the multiple web applications generating the metadata matching the advertising criteria.

12. The computing device of claim 8, wherein the operations further comprise specifying the metadata to match the advertising criteria.

13. A non-transitory computer readable memory storing instructions that when executed cause a processor to perform operations, the operations comprising:
- receiving metadata sent from a mobile wireless device to a metadata server, the metadata describing interactions by a user with one of multiple web applications executed by the mobile wireless device;
- storing the metadata in a database in the metadata server;
- associating the metadata to a user profile associated with the user mobile wireless device, the user profile grouping the metadata according to a corresponding web application generating the metadata;
- receiving a request for a target group from an advertiser, the request specifying advertising criteria;
- querying the database for the advertising criteria;
- retrieving a group of user profiles having the metadata that matches the advertising criteria;
- generating a list of identifiers for the group of user profiles, each identifier in the list of identifiers corresponding to one user profile in the group of user profiles having the metadata that matches the advertising criteria;
- sending the list of identifiers to the advertiser in response to the request for a target group;
- charging a fee to the advertiser for the list of identifiers and for querying the database for the advertising criteria;
- determining which ones of the multiple web applications generated the metadata matching the advertising criteria; and
- sharing the fee with the ones of the multiple web applications generating the metadata matching the advertising criteria.

* * * * *